United States Patent [19]

Schumacher

[11] Patent Number: 4,794,011

[45] Date of Patent: Dec. 27, 1988

[54] PROCESS FOR THE TREATMENT OF VEGETABLE RAW MATERIALS

[76] Inventor: Heinz O. Schumacher, Höperfeld 26, D-2050 Hamburg 80, Fed. Rep. of Germany

[21] Appl. No.: 894,057

[22] Filed: Aug. 7, 1986

[30] Foreign Application Priority Data

Aug. 14, 1985 [DE] Fed. Rep. of Germany ....... 3529229
Dec. 14, 1985 [DE] Fed. Rep. of Germany ....... 3544298

[51] Int. Cl.$^4$ .......................... A23L 1/18; A23L 1/211; A23P 1/12
[52] U.S. Cl. .................................. 426/448; 426/417; 426/465; 426/489; 426/511
[58] Field of Search ............... 426/447, 448, 511, 507, 426/524, 465, 417, 489

[56] References Cited

U.S. PATENT DOCUMENTS 3,764,708 10/1973 Aonuma et al. ................... 426/511

FOREIGN PATENT DOCUMENTS 2722245 11/1978 Fed. Rep. of Germany .
3529229 5/1986 Fed. Rep. of Germany .

Primary Examiner—George Yeung
Attorney, Agent, or Firm—Lane and Aitken

[57] ABSTRACT

A process for the treatment of vegetable raw material such as soy beans is disclosed wherein the vegetable raw material is subjected to one of the following: (1) an extraction step, (2) a compressing step, and (3) an extraction step and a compressing step. In addition to one of the three aforementioned procedures, the vegetable raw material is also subjected to a thermal conditioning step in which the material is heated to a temperature above 100 degrees Celsius and a pressure above atmospheric pressure in an oxygen-free atmosphere. According to the process of the present invention, the thermal conditioning step is carried out at a pressure of 2.0 to 25 bar for a time period of between 0.1 and 5 seconds and, after the time period, the process calls for suddenly releasing the pressure, moving the heated material into an oxygen-free zone, and cooling the heated material to a temperature below 100 degrees Celsius in the oxygen-free zone.

17 Claims, 10 Drawing Sheets

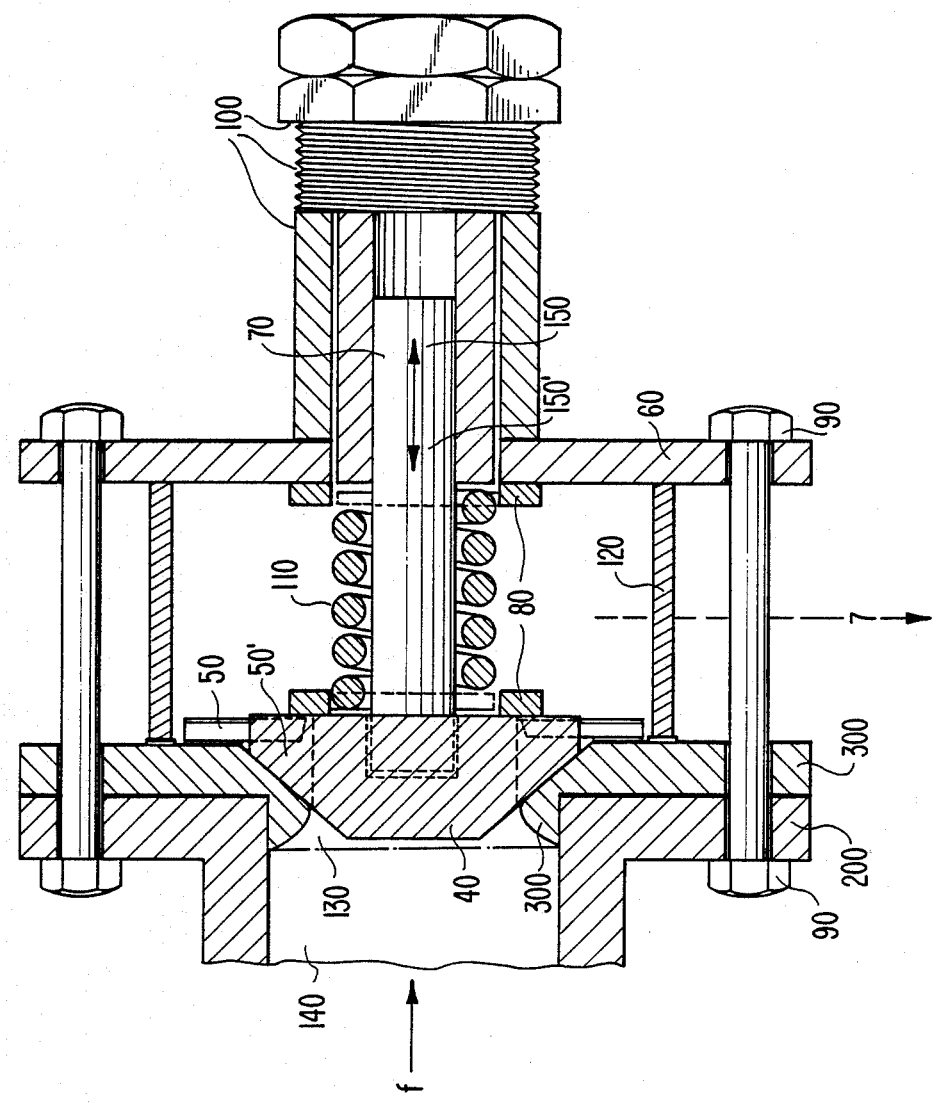

PROCESS FOR THE TREATMENT OF VEGETABLE RAW MATERIALS

In addition to an acceptable oil or fat—that is, a clear oil or fat whose color is stable, and which will be called oil in the following—the solid residues remaining after the oil has been separated and the extraction scraps or powders and press cakes are of very great economic importance as concentrated feeds containing albumen whose value as fodder constitutes an essential factor in providing a basis for calculating the operating costs and processing costs involved in the processing of oil seeds.

Typically, in evaluating the quality of soy extraction scraps as fodder, for example, are the content of soluble—that is, easily digestible proteins (albuminous materials), whose content should be above 45%, if possible, in the first place, and a minimum of enzyme activity (urease activity) that—measured in N/g/min/30° C.—cannot exceed a value of 0.3, in the second place.

Urease, a urea-splitting enzyme (Amidhydrolase), which occurs in various bacterial forms in soy beans—but not only there—splits urea while forming $CO_2$ and $NH_3$—thus, for example, 1 g of urease at 20° C., approximately 60 g of urea per minute. The pungent odor that causes an animal to refuse such feed is owing to the ammonia separation that takes place there.

Avoiding this undesirable effect in the scrap is only possible through destroying the urease or inhibiting its enzymatic activity or through thermal decomposition of urea, ureal compounds and derivatives or other substances that are decomposed enzymatically by urease while forming ammonia. In the case of urea itself, the second possibility exists at temperatures above 130° C.

Dried soy beans—only mentioned here as an example of leguminous seed—on the average contain between 34 and 38 g of protein (albumen compounds) per 100 g, which, in addition to carbohydrates and fats, constitute the third big group of foods and emergency stocks for humans and animals, so that considerable importance is attributable to protein from the points of view of biology and the physiology of nutrition.

The proteins, like the other colloids, are rather sensitive to physical and chemical influences. However, denaturation is a function of several factors, and especially of the protein molecule (chain length, molecular weight, nature of the amino acid group, etc.), the temperature, the time and especially the pH value of the surrounding medium.

Therefore, the full development of the especially water-soluble proteins during the entire process of seed preparation, squeezing, extraction, etc., down to the debenzinized and toasted scrap is a primary concern of any technical procedure for obtaining oils and fats from seeds while simultaneously producing utilizable scraps as fodder.

As was stated initially, urease activity has considerable influence on the quality of the scrap, and therefore the urease content in the seed should be eliminated to the extent possible during the process of preparing the seeds. However, this is done only partially successfully. Since the enzyme activity of the ureas becomes effective at temperatures above 30°-40° C., thermal conditioning stages, in the presence of water vapor, if desired, must be introduced before the extraction (or squeezing) takes place in order to achieve the before-mentioned goal. However, an optimal activation or destruction of ureas has not yet been satisfactorily demonstrated.

In the first place, between 95 and 98% of the 34 to 38% of proteins present in the dried soy raw material are generally water-soluble—that is, fully effective for the food sector (fodder). However, as a result of toasting as the last step in the scrap debenzinization and drying process at high temperatures, the proportion of water-soluble protein decreases sharply (high toaster temperatures add water vapor atmosphere) and under known operating conditions it reaches values of the proportion of water-soluble protein in the entire albumen of 28 to 38%.

Toasting at lower temperatures would indeed stop the decrease in water-soluble protein, but, on the other hand, the result would be that the urease content would hardly be changed.

It is a part of the general state of the art, in the production of food oils and fats from leguminous seeds—from soy material, for example—to subject that material to a thermal treatment before the extraction with solvents, to decrease the pressure on such stages of the oil and fat cleaning process as delecithinization, desliming, refining, deodorizing, neutralization, distillation, etc., or to do without portions of these stages of the process completely.

A large number of undesired foreign bodies in the final product (oil, fat, scrap) can be reduced to a minimum early by such a thermal treatment of the raw material before the extraction or before the combination of squeezing and extraction. In that process, urea compounds are broken up, oxidases put in for the extraction of a significant water content are rendered inert, husk material is loosened or removed by soaking, the viscosity of the oil or fat is lowered by dry rendering and albuminous materials are coagulated.

In particular, a coagulation of the albuminous compounds that is as complete as possible not only counteracts a smearing of the extrusion or the froth formation in the extractor but it also promotes percolation during the extraction process.

Too high a water content in the raw material before the extraction makes the extraction output worse—that is, an optimal transition of the raw material into the miscella is not achieved.

The lecithins, which are important in a very large number of areas of pharmacy and the physiology of nutrition, can be precipitated and acquired more completely by an optimally designed thermal preliminary treatment process. The removal of the phosphatides, whihh are present initially in the crude oil, colloidally dissolved, in quantities of up to 5.5 percent by weight, can be improved considerably and rendered optimal by that means.

Various methods and installations are available for the thermal conditioning of the seed—soy beans, for example.

In addition to the use of steam-heated installations consisting of nests of boiler tubes, the so-called heat pans, in particular, gained an important position in the oil recovery technology early. In that technique, the raw material, after it has been cleaned, crushed, dried and processed into flakes or little slabs on corrugated rollers and then on plain rollers, is heated in a multistage, vertical system equipped with steam-heated bottom plates and provided with agitators.

However, at atmospheric pressure there is an upper limit to the temperature of this conditioning process because, in the first place, too strong a denaturation of the proteins would occur and, in the second place, products of decomposition could get into the oil or fat. On the other hand, people are endeavoring to exclude the enzyme activity extensively as early as in the thermal conditioning stage.

Therefore, obtaining the water-soluble proteins, excluding the enzymatically acting urease, the coagulation of pectin and albuminous substances and as good operating cost figures as possible are the objective of (thermal) seed conditioning.

In a procedure that has become known, in which the preparatory stages of cleaning, crushing and drying, the processing on corrugated rollers followed by a seed-heating process and then processing on plain rollers follow the conservative procedural pattern that has been carried out many times in the past, the little slabs are subjected to a common thermal conditioning process after being processed on plain rollers and then they are tempered at atmospheric pressure and approximately 100° to 110° C. A vertical, multistage system that is similar to the heat pans again serves as the tempering apparatus, and it produces an increased inhibiting of the urease activity (and an improvement of the odor of the scrap by that means), an increased lecithin yield and an improved speed of percolation (extraction performance) in a process of relatively long duration.

However, as a result of the long period of time spent in the tempering stage, an increasing denaturation of the albuminous substances, whose water solubility declines, a considerably increased consumption of energy (for the blower agitators of the tempering apparatus) and a decrease in the content of urea compounds, which are decomposed or split up, in spite of temperatures below the decomposition range of urea, because of the long period during which they are acted upon by superheated steam, obviously prove to be disadvantageous. Direct influence of oxygen (air) results in undesired oxidation reactions. Furthermore, this procedure only delivers satisfactory extraction results when the raw material is rolled out to little-slab thicknesses of approximately 0.2 to 0.3 mm.

A primary object of the invention, in a procedure for the purpose of obtaining oils and fats from oil seeds and oil fruits, and especially leguminous seeds such as soy beans and related vegetable raw materials, for example, in which the raw material, after cleaning, drying and crushing, if indicated, is subjected to an extraction and/or squeezing process and, after separation and reconditioning, an oil or fat suitable for use in food and a residue, the scrap, which can be used as concentrated feed, are obtained, is to make the stage of the so-called (thermal) conditioning of the raw materials before the squeezing or extraction as good as possible in such a way that, where improvement of the quality of the oil, the fat and the scrap is concerned, th proteins as a whole and the water-solubility of the proteins are retained to a considerable extent, the urease as such is eliminated or its activity is essentially inhibited, the extraction performance with solvents is improved by increasing the speed of percolation, the hydratableness of the phosphatides is increased, so that, as a result, the residual phosphatide content in the oil or fat can be reduced, and finally the installation's consumption of energy with respect to conditioning, squeezing, extraction and the preparing of scrap can be reduced to a minimum.

This primary object of the invention ss achieved by means of the features cited in claims 1 through 18.

Depending upon the nature of the raw material, and especially its oil or fat content, the conditioning temperature in accordance with the invention falls between 105° and 148° C., and especially between 118° and 135° C.

In this process—that is, before the sudden release of pressure—the pressure falls, specifically, between 4 and 18 bar, and preferably between 3 and 6 bar.

The time spent in the conditioner, whose preferred, but not the only possible, embodiment will be described next, lies between fractions of seconds and a few seconds, and thus between about 1/10 of a second and 5 seconds before the sudden release of pressure. The time spent in the conditioner is also a function of the material to be processed.

The operating data cited above for the new (thermal) conditioning procedure can be varied extensively within the respective limits of the various factors involved.

Thus, the processing time at high temperatures—from 140° to 148° C., for example—is a little more than 1 second. The pressure should be approximately 4.0 to 8.0 bar here. At relatively low temperatures—approximately 110° to 120° C.— processing times of between 2 and 4 seconds are required in order to accomplish the task defined above.

It is important for the new procedure to be carried out in an environment that is as free of air and oxygen as possible. When there is a simultaneous pressure and temperature build-up, this requirement is satisfied most expediently by water vapor, which the surrounding atmosphere of 1.2 to 1.3 bar preferably forms until the spontaneous release of pressure to atmospheric pressure or lower with a simultaneous cooling to temperatures under 100° C., and especially to 60° C. —that is, to extraction temperature—takes place. At the same time, the moisture content of the material to be processed is also regulated or adjusted by water vapor.

The following results are achieved by means of the new procedure involving high-temperature and high-pressure conditioning with a sudden release of pressure in an atmosphere that is free of air and oxygen.

The urease is decomposed or its activity is inhibited as a result of heating to the indicated high temperatures.

Because of the short heating times at increased pressures, the proteins are not decomposed nor is the ir water-solubility materially reduced.

Urea compounds are reduced to a miiimum. Stable ureas are not touched.

The quality of the scrap as a whole is improved by the above-mentioned advantages.

Individual operational improvements are a sharply decreased consumption of energy because of the short time spent in the condition and greater extraction (and squeezing, where applicable) performance because of an improved speed of percolation, so that, taken all in all, there is an increase in plant capacity, a smaller residual phosphatide content in the pure oil after desliming and in the pure fat, and the burden borne by the dryer/toaster in the process of preparing scrap is eased.

The introduction of the conditioner stage into the procedure for obtaining fat and/or oil from oil seeds and oil fruits by extraction and/or squeezing can take place in various positions, depending upon the raw material that is used, and especially upon its oil content or its fat content.

Another object of the invention is the creation of another preferred device that works in accordance with the principle of the single worm-gear or multiworm-gear press, such as is known from the foodstuffs, plastics and medicine technologies. In that device (cf. FIG. 1=FIG. 5 of the original patent), the material (S)—for example, cleaned, dried, crushed little soy bean slabs from 0.4 to 0.6 mm thick that have been rolled on plain rollers—that has been brought in through the funnel (1) (FIG. 5) by means of a suitable dosing and operating mechanism (14), for example, is pressed through the short feed pipe (17) continuously into the collecting area (A) of the pressure-building system formed by the tank and the worm shaft (3) and traverses that system through the compression zone (B) and a high-pressure zone (C) and finally attains decompression and expansion in (D) after an optimum pressure ($P_m$) has been reached.

The entire collecting area is charged with a water vapor atmosphere up to the short feed pipe (17) through jets (10).

The passage depth of the shearing elements (12) in the area of the high-pressure zone (C) has a minimum value (5) by comparison with the worm gear width, and it expands (2, 4) in the material-supply direction in zone (A). Since the compression zone (B) for building pressure is important, the introduction of high-pressure water vapor (9) through the system of jets (13) takes place in it.

The continually compressed material is heated, partly by the steam (9) and partly by additional heating elements (22) to the prescribed temperature as it passes continuously through the conditioning system. At the same time, the water content rises from 10 to 12 percent by weight to over 12%, and in special cases to from 18 to 20%. Toward the end of the high-pressure zone (C), a compact, heated material that is under pressure has formed in the passage (5) that emerges into the receiver (7) through the shearing aperture (6) and the connecting piece (21) while expanding to a pressure in the atmospheric range. A spontaneous, sudden release of pressure linked with a cooling off of the material to below 100° C. takes place as a result of the transition from the high-pressure zone (C) into the connecting piece (21) and into the stabilizing zone or receiver (7). When the material is discharged from the connecting piece (21), the receiver (7) is preferably kept closed. The material is continuously discharged out of (7) by means of a suitable transportation system—a screw conveyor (18) for example—that can also resemble an expander. The receiver (7) can be connected with a system (34) generating a vacuum. The conditioned final material is designated (S'); the installation can have cooling elements (33) that serve the purpose of regulating the temperature. Finally, matrixes for shaping, and especially for hollow pieces (pipe lines, etc.) can be connected with the shearing aperture (6), so that an expanded material with a big surface is produced.

The installation shown in FIG. 6 works in accordance with the same principle as the installation shown in FIG. 5—that is, a gradual build-up of the pressure in the material, transition to high pressure by means of high-pressure water vapor and a spontaneous and sudden release of pressure. The construction of the containers forming the high-pressure zone (C) is different. According to FIG. 6, it is a simple pressure tank (25).

The material (S) to be conditioned goes through the funnel (1) into a conveyor unit (24), which, as in FIG. 5, is a screw conveyor, a compressing screw conveyor or a screw conveyor resembling an expander. Both the funnel (1) and the connecting piece linking it to the unit (24) are charged with rinsing steam through the conduit (10) to create an atmosphere that is free of air and oxygen. The receptacle (25) equipped with a manometer (26) and a pressure relief valve (27) is charged with high-pressure water vapor (9) through the multiple jet system (13). Naturally, the pressure receptacle (25) can also be equipped with heating and cooling elements that are not shown.

The high-pressure zone (C) is built up in (25) through the influence of the high-pressure water vapor (9)—cf. FIG. 5.

The spontaneous release of pressuee and expansion of the material takes place, in accordance with FIG. 6, through a suitable system of valves (28), into the receiver (7), and it is advantageous for the transition from the pressure tank (25) to the receiver (7) to take place through a second conveyor unit (29) that can be constructed like the unit (24). It has proved advantageous to charge the conveyor unit (29) with rinsing steam (30), too, to maintain an atmosphere that is free of air until the material cools down.

A in the installation shown in FIG. 1, the receiver (7) serves as a stabilizing zone in which the material cools off to temperatures below 100° C. This is additionally supported by the vacuum-generating system (34), through which expansion steam from (25) and rinsing steam through (30) are constantly being drawn off.

A suitable discharge element for which rotating sluices, screw conveyors, slides, valves, etc., are appropriate parts, constitutes the final portion of the installation shown in FIG. 6. The material (S') also leaves this installation in an expanded, thermally conditioned form.

In practical use of the installations described above, it has been observed, in fact, that the transition from high pressure in the expander or conveyor unit to reduced presuure or atmospheric pressure in the following expansinn zone (7) with relatively dry materials can be carried out without any difficulty, but that, especially in the case of very wet material with a water or a solvent content, the build-up of pressure being aimed at can only be obtained to a limited extent because a steady drop in the pressure in the direction of the expansion zone (7) that comes after it occurs as a result of the "fluidity" of the wet material before passing through the matrix or the system of valves (according to FIG. 6)—that is, before leaving the expander and the pressure tank (25).

The result of this is that the pressure difference P (pressure in the expander): P' (pressure after the expansion has ended) that is required for a spontaneous release of pressure from the expander into the following expansion zone is not achieved. Consequently, however, neither is the flash vaporization of the water or the solvent from the material being processed optimally achievable nor can the high pressure required for extremely high temperatures of 160° C., for example, be built up in the expander itself—that is, during the thermal treatment.

The action of the expander—for reasons of simplification, the object of this supplementary application in connection with German Pat. No. 35 29 229 is explained in greater detail with the help of FIG. 5, although the same construction features and actions are also applicable to the installation shown in FIG. 6—is a function of the volume capacity, the performance of the driving motor for the conveyor element in the expander (screw conveyor), the exhaust aperture (matrix, consisting of the sum of all boring cross sections in the matrix), and the fluidity, or the rheological behavior (viscosity), of the material to be processed.

An optimal result of the procedure—that is, a rapid build-up of high pressure at a relatively high temperature in the expander and an instantaneous—that is, spontaneous—release of pressure into the expansion zone (7)—connected with the flash vaporization of water or solvent, can only be obtained when all the afore-mentioned conditions are satisfied.

However, that has only been possible in continuous operation to a limited extent up to now because a quick transition from the high-pressure zone (in the expander) to the expansion zone is hard to bring about for reasons connected with expander construction, and especially when the action of the moist or wet material in flowing works against a packing at the expander end, so that material runs out and a spontaneous release of pressure does not take place, as was desired and is required.

Serious impairments of the functioning of the procedure— that is, operating difficulties because of irregular product quality, often connected with liquid areas in the emerging material or—the other way around—with clogging at the outlet from the expander—are the result of this. Consequently, interruptions to the normally continuous procedure, dismantling and cleaning the inner parts of the expander and also often the repetition of the material-processing—that is, putting the material back into the expander—and a resultant additional consumption of energy result, and when that happens the effect on the products' quality of such repeated throughputs should not be underestimated.

Therefore, constant monitoring of the functioning of the installation is unavoidable, and especially since the material in the expander can harden if there is a current failure, so that a troublefree restarting of the installation is made impossible.

In further development of the device described in German Pat. No. 35 29 229 for carrying out the thermal conditioning of oil seeds and oil fruits, and particularly leguminous seeds and related vegetable raw materials as shown in FIGS. 5 and 6 of the original patent, consisting of a pressure build-up zone that can be charged with water vapor and a high-pressure zone that can be acted upon by high-pressure water vapor and a pressure-release part that leads into a stabilzation zone, with the pressure build-up zone and the high-pressure zone, together, being formed by a screw-conveyor-shaped pressing system constituting the expander, it has turned out, surprisingly, that the disadvantages of the device of German Pat. No. 35 29 229 summarized above can be overcome if a suitable contact pressure head is provided right at the outlet aperture of the expander, or in special cases right after the matrix, to keep the outlet pressure constant, which contact pressure head keeps the outlet aperture of the expander or the aperture of the matrix open by means of an adjustable counterpressure P" until the pressure P in the expander exceeds the counterpressure P" of the contact pressure head, with the contact pressure head being released from the expander's outlet aperture or the aperture of the matrix as a result, thus clearing the way for the material to emerge from the expander.

Then the outlet slit between the contact pressure head and the aperture of the expander or the matrix remains open until the pressure P in the expander has fallen off to a little below the counterpressure P". The counterpressure P" now guides the contact pressure head back to its closed position, so that further discharging of material is prevented. If the operational performance in the expander falls off, the outlet slit between the aperture of the expander or the matrix, on the one side, and the contact pressure head, on the other, is only opened enough so that the counterpressure P" remains unaltered once it has been adjusted or regulated.

The adjustment of the counterpressure P"—that is, of the pressure with which the contact pressure head rests on the aperture of the expander or the matrix—can either be accomplished mechanically by means of spring elements or all other suitable elements for that purpose can be made use of, assuming that they make possible a movement of the contact pressure head that is dependent upon pressure.

In particular, pneumatic and hydraulic motion drives are suitable; an electromagnetic application of pressure to the contact pressure head is also advantageous in practice. Contact pressure heads can differ, depending upon their specific functions, the nature of the movement and the application of pressure (nature of the drive) and the configuration of the aperture of the expander. The only decisive factor is for the expander outlet to be completely closed and absolutely watertight when it is pressed on, so that the operational pressure P in the expander can build up optimally and the required pressure difference $P \rightarrow P''$ is set, undisturbed, under the desired operating conditions. This also holds true when no material is conveyed to the expander to be processed.

The contact pressure head can have the shape of a sphere or a hemisphere, for example, and it can be conical, tapered, flat, pointed or can be a segment of a circle, depending upon the shape of the outlet aperture on the expander or the matrix that follows it that is to be closed.

Still another object of the invention is concerned with a device that is especially suitable for the thermal preliminary treatment of the leguminous seeds (conditioning) even before the extraction process.

In obtaining oil for food from leguminous seeds and other material with a kernel, and especially from soy beans, it is necessary to carry out a thermal processing before the extraction takes place—that is before the oil is extracted with solvents—to ease the burden of the oil-cleaning stages such as delecithining, desliming, refining, deodorizing, neutralizing, distilling, etc., and to do away with parts of those operations entirely.

By means of the thermal processing of the raw material before the extraction process or the combination of squeezing and extraction that is still carried out frequently, a large number of undesirable foreign substances are already changed in the raw material in such a way that they can produce a minimum of harmful effects in the oil-cleaning stages. In particular, urea compounds are broken down, oxidases are made inert, the water content that is important for the extraction is regulated, husk material is loosened by soaking and removed, lipoproteins are decomposed, the viscosity is lowered by fusing the fat (oil)—which results in increasing the extraction output considerably—albuminous materials are coagulated, etc.

In particular, a coagulation of the albuminous compounds that is as complete as possible not only works against a smearing of the presses or the formation of foam in the extractor, but it also promotes percolation during the extraction process.

Too high a water content in the raw material before the extraction makes the extraction output worse—that is, an optimal transition of raw material into the miscella is not obtained.

The lecithins, which are important in a great many areas of pharmacy and the physiology of nutrition, can be separated completely and obtained by an optimally designed thermal preliminary treatment process. The removal of phosphatides, which are present, initially dissolved colloidally in the raw oil in quantities of up to 3.5 percent by weight, can be improved considerably and made as effective as possible by that means.

Various methods and installations are available for the preliminary thermal processing (conditioning) of seeds, and especially of soy material.

In addition to the use of steam-heated units consisting of nests of boiler tubes that are primarily arranged horizontally, the so-called heat pans, in particular, gained an important position in the extraction technology early. The raw material, after it has been cleaned, crushed, dried and processed into flakes or little slabs on so-called plain rollers, runs from top to bottom through several—usually 3 to 5—bottom plates located one above the other, on which it is moved by agitators and conveyed to the respective next lower bottom plate through an opening for that purpose. The bottom plates are heated with steam. Furthermore, devices for blowing water vapor straight in can be mounted.

At atmospheric pressure, the temperature of the preliminary thermal processing has an upper limit because a denaturation of the proteins (high temperature/low pressure or atmospheric pressure) that goes too far can lower the nutritional value of the extraction residue (scrap). Furthermore, there is a danger that bad-smelling and bad-tasting substances might mingle with the oil.

Therefore it is of critical importance for the temperature and the moisture content of the raw material to be controlled, so that pectin and albuminous materials coagulate optimally and so that both end products of the extraction process—that is, oil and the residue (scrap)—are of the best possible quality with the least possible consumption of energy and expenditure for plant. German Offenlegungsschrift DE-A 27 22 245 describes a procedure for thermal processing of the type defined above, and especially for the heat processing of soy material, in which the soy seed is first moistened to a water content of 12 to 25 percent by weight and is processed at temperatures between 90° and 120° C. in the presence of water vapor. When this is done, the soy product is present in the form of thin little slabs with a thickness of approximately 0.22 mm that were produced on plain rollers.

In the known procedure, these little slabs are moistened to the above-mentioned water content by means of steam applied directly while they are constantly being moved, and then they are heated to the temperature of 110° C. in a tower with several bottom plates resembling the heat pans at atmospheric pressure. While that is being done, the moisture content decreases from approximately 17 percent by weight when the moistening takes place to approximately 11 percent by weight at the end of the multistage processing tower.

Important for this procedure is a well rolled-out material (approximately 0.2 to 0.3 mm thick little slabs), so that the results cited above as the purpose of the thermal processing are obtained.

The known procedure works at atmospheric pressure and a temperature of about 110° C. Higher temperatures are out of the question at that pressure—that is, they cannot be obtained.

However, it quite evidently is the aim of seed-extraction technology to make use of higher temperatures in preliminary thermal processing to achieve as good an inactivation of enzymes as possible, in the first place, and to be able to make the period during which the material is kept hot variable, in the second place, for it is precisely at very high temperatures—depending upon the amount of time the processing takes—that the coagulation of albuminous materials reaches an optimal point and urea compounds, sugar, carotene and the like are decomposed rapidly and rendered harmless.

The so-called plain rollers for the production of little slabs or flakes are an important energy consumption factor in the framework of an extraction installation for soy products, for example. Therefore efforts have been made for a long time to convey little slabs to the extraction process that have a considerably greater thickness than the 0.2 to 0.3 mm they have had up to the present. That has not been possible up to now since no penetrating effect—that is an effect that even involved the internal portions of the slabs—was sought with the known installations for preliminary thermal processing. Slab thicknesses of 0.4 to 0.6 mm or even more are the goal at which a commercially designed extraction installation for oil for food is aiming.

Another object of the invention is to reduce the consumption of energy of all extraction installations for producing oil for food from leguminous seeds, and especially from soy material, to obtain an improvement in the quality of the material and the technology used in obtaining the end products, oil and scrap, and to reduce the amounts of time, money and effort devoted to procuring and operating the apparatus.

This object is achieved by means of a dvvice for the preliminary thermal processing of leguminous seeds for producing oil by means of solvent extraction by first rolling out the material that has been prepared by cleaning, drying, crushing, etc., to little slabs with a thickness of from approximately 0.4 to 0.6 mm, and by treating it, in a fully continuous, horizontal and cylindrical system designed for pressures up to at least 25 bar and equipped with conveyor elements, in a gradually increasing pressure in the material in an atmosphere free of air and oxygen, and especially water vapor atmosphere, with so much high-pressure water vapor, at the moment when the increasing pressure in the material has built up to a value of approximately 4.0 to 0.0 bar, that a temperature between approximately 105° and 60° C. comes into being as a function of the pressure build-up and the temperature-pressure relationships of the high-pressure water vapor in the material, with the high-pressure water vapor fed in at the given material pressure, taken as a whole—that is, without the formation of remaining pockets of steam—condensing in the material and producing a moisture content of the material of approximately 12 to approximately 20 percent by weight.

By these measures, one succeeds in working at such temperatures of 125° C. and higher, for example, as will permit a variable period of keeping the material hot, thus making the coagulation of the albuminous materials as perfect as possible, practically completely destroying foreign substances, permitting use of even thicker flakes or little slabs of material (these exhibit a completely uniform analysis of characteristics down to their cores after the high-pressure treatment) and countering any negative effects of the extremely high temperatures with the application of pressure. The quality of the triglyceride oils is not impaired by this. Instead, the burden of the oil-cleaning stages is eased considerably.

The procedure can be improved considerably by having a spontaneous expansion of the material take place atter the high-pressure water vapor treatment is carried out. This expansion to atmospheric pressure should take place in a space that is free of air and oxygen, and most preferably in a water vapor atmosphere. After remaining for a period of 1 to 15 minutes in the expanded form in a water vapor atmosphere (approximately 0.9 to 1.4 bar), the material that has been prepared in that way can be discharged, dried and cooled to the extraction temperature (the boiling point of the extraction agent).

It has proved to be especially advantageous if the feeding of the high-pressure water vapor takes place when a characteristic material of approximately 4.5 to 8.0, and particularly from 5.2 to 7.5 bar, has built up in the horizontal pressure reactor. When that is the situation, the quantity of high-pressure steam and its characteristic pressure and temperature are adjusted so that a temperature of 110° to 150° C., and particularly 125° to 140° C., is adjusted in the material to be processed.

The quantity of water vapor used at the material intake to produce an atmosphere free of air and oxygen should preferably be measured and regulated in such a way that, in addition to a practically complete steam atmosphere, the material entering will have an initial temperature of at least 90° C.

In this phase of the procedure, naturally, the use of pure water vapor is not absolutely necessary. A mixture of water vapor and an inert gas such as carbon dioxide, nitrogen or inert gases can also be used, if desired. The important thing is for the entire procedure to take place in a system that is free of air and oxygen, so that any oxidative influence is avoided at relatively high processing temperatures.

Figure 6:
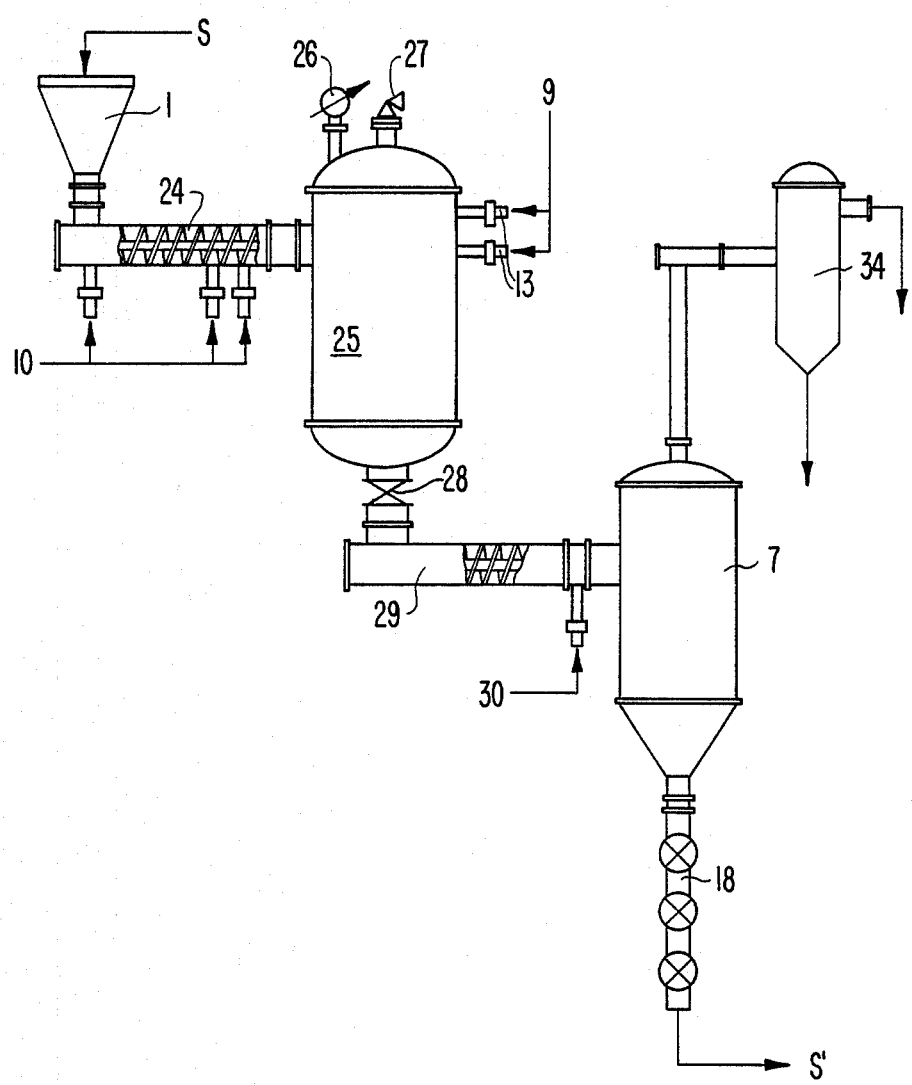

FIG. 6 also shows a suitable device.

FIG. 7 shows the basic structure of a contact pressure head according to the present (supplementary) invention that is suitable for keeping the pressure constant at the outlet and has a cup spring as the element that generates the counterpressure P''.

Figure 3:
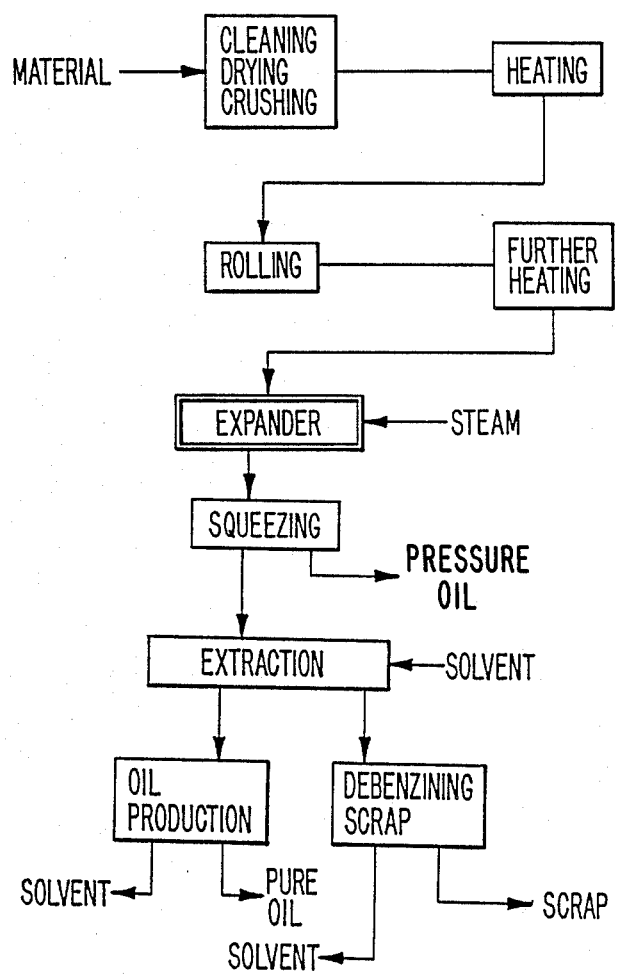

FIG. 7a shows a section of the pressure head shown in FIG. 3.

FIG. 8 shows the configuration of various embodiments of the closing surface of the pressure head.

Figure 9:
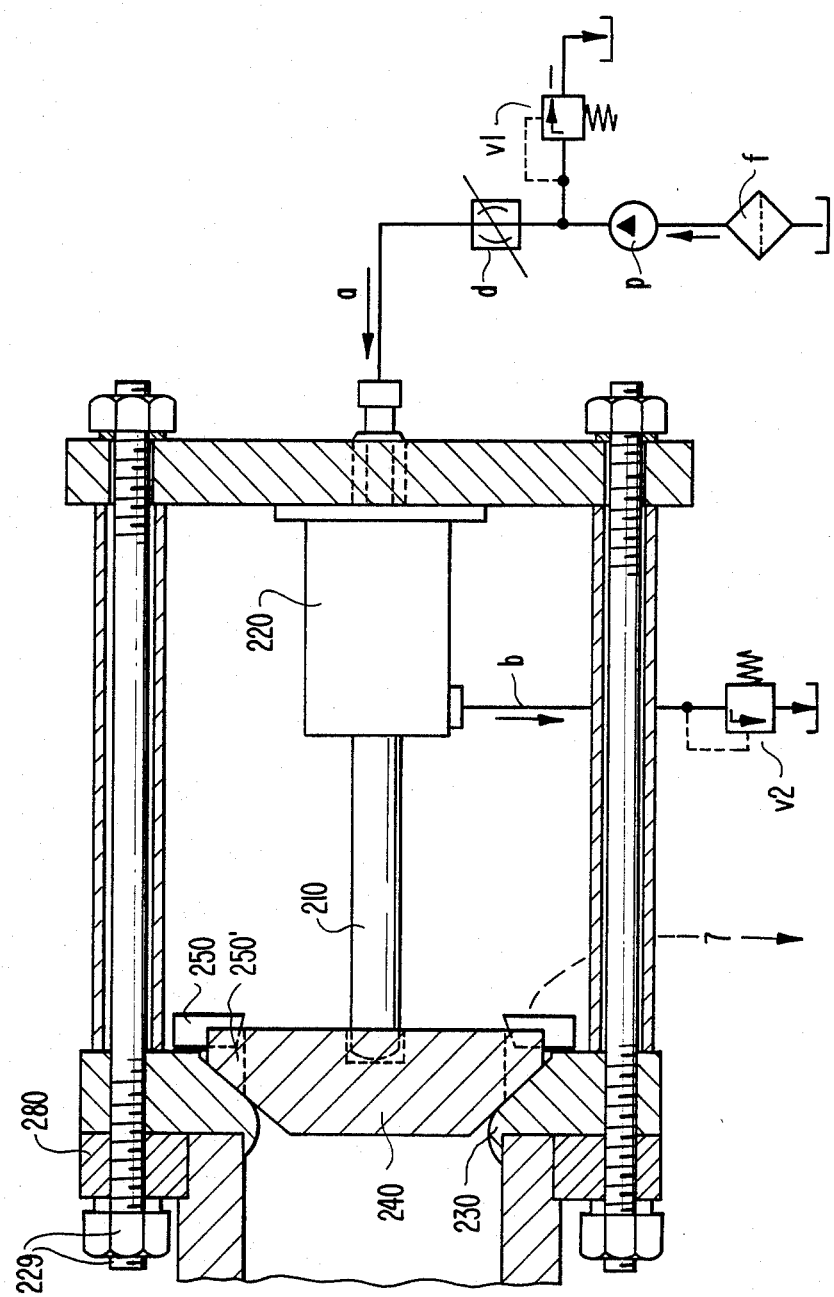

FIG. 9 shows an especially advantageous and operationally tested embodiment of the invention with hydraulic generation of the counterpressure P''.

Figure 10:
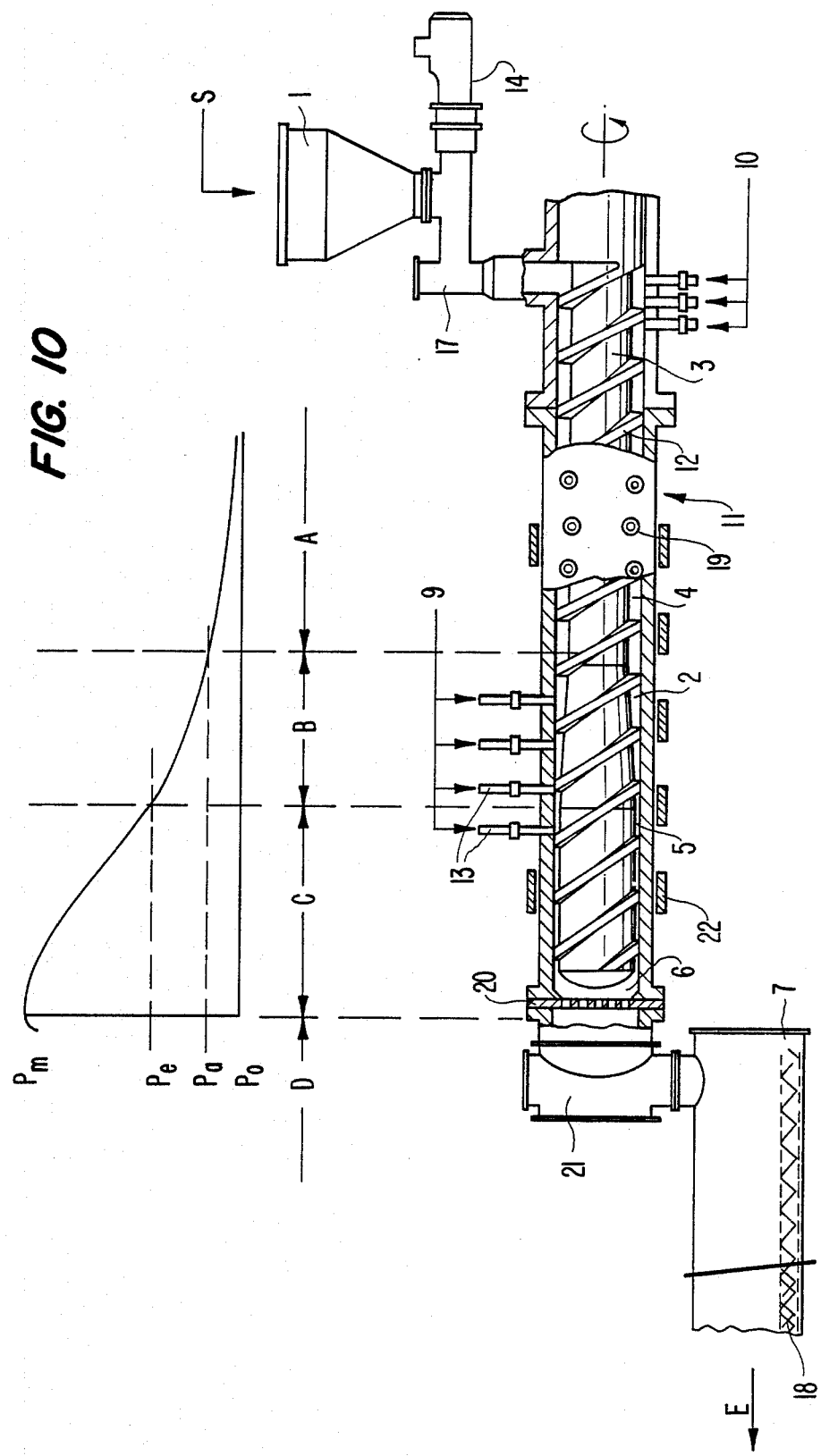

FIG. 10 shows a device for preliminary thermal treatment.

Figure 1:
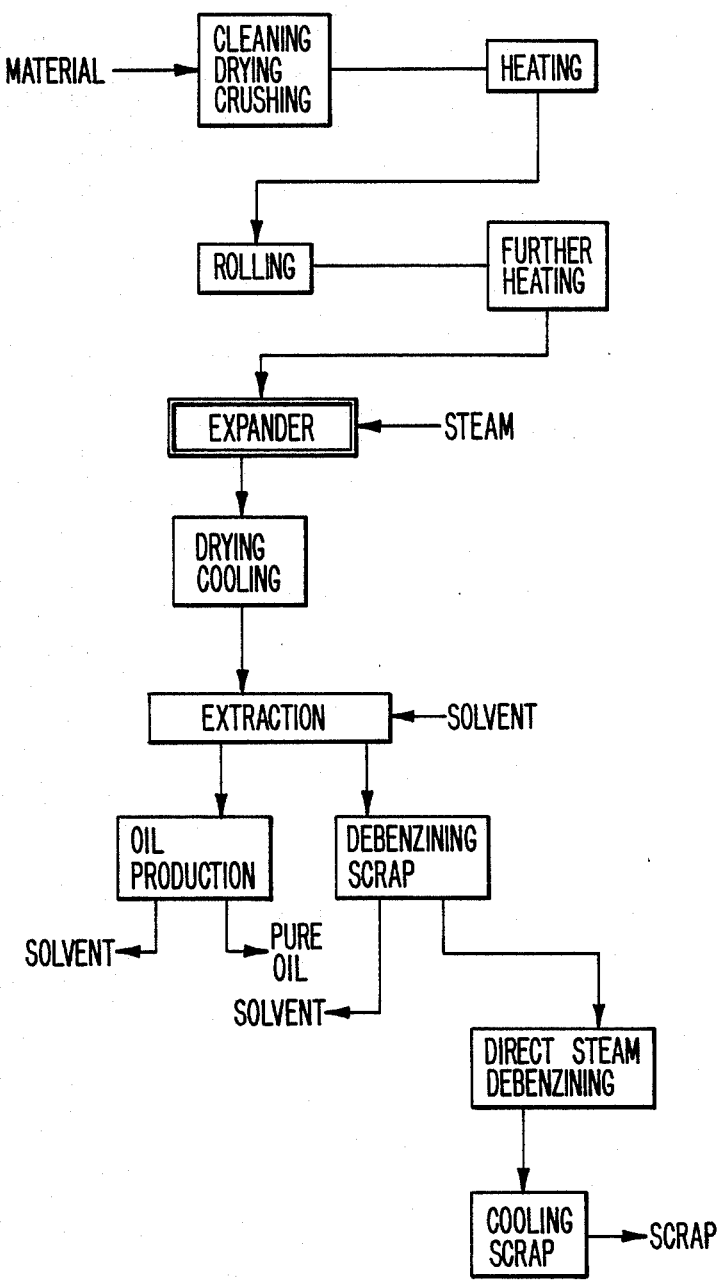
FIGS. 1 through 4 show the first object of the invention schematically.

The generally applicable flow diagram presented in FIG. 1 shows the course taken by the procedure for seeds with a low to an average oil content, somewhere on the order of magnitude of 17 to 45 percent by weight. It is especially suitable for procedures carried out without squeezing—that is, the production of oil and fat only by extraction with solvents.

Suitable raw materials are:

Sunflower seeds, soy beans, cottonseed, beechnuts, hemp seeds, linseed and rape seed.

The seed (S) is first cleaned, dried and crushed (RTM) in a known way, heated (WI) to approximately 40° to 60° C., plain-rolled (GW), further heated to 80° to 95° C. (WII) and conveyed into the expander (EXP), which is especially suitable for carrying out the procedure of the invention. The short high-temperature, high-pressure treatment followed by a sudden release of pressure in a drier/cooler (K) is accomplished by feeding in steam (D). This process, which has already been described, is fully continuous.

The procedural steps that follow are state-of-the-art steps, and they consist of extraction (Extr.) with solvents (LM), the production of oil (ÖR), which consists of cleaning, delecithining, distillation, etc., and the production of pure oil (RÖ) along with solvent (LM'), which is conveyed to the extraction unit, indirect debenzining of the scrap (EB), direct steam debenzining (NEB), cooling of the scrap (K) and scrap production (SCH).

Figure 2:
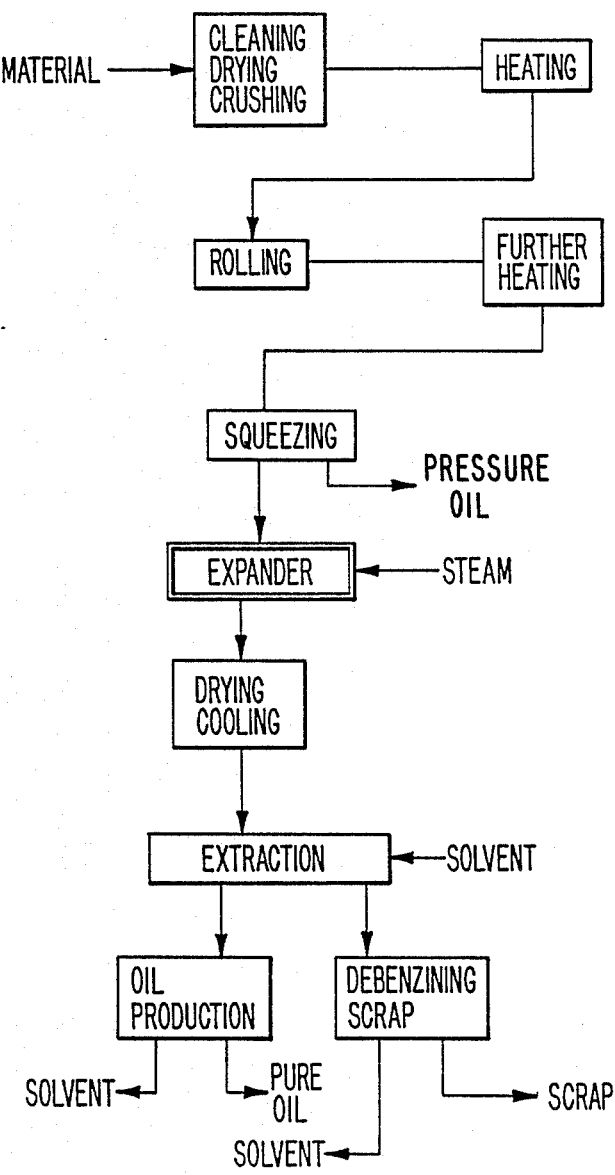

The diagram presented in FIG. 2 is especially suitable for raw materials with a very high oil or fat content, so that squeezing before the extraction is necessary. Such raw materials are:

shelled peanuts, hazelnut kernels, almonds, the kernels of oil palms, sesame seeds and the kernels of walnuts.

The stages RTM), (WI), (GW) and (WII) have the same meanings as in FIG. 1.

In FIG. 2, the suueezing (PR.) of the raw material during the production of pressure oil (PÖ) is now interpolated before the conditioning in accordance with the invention in the expander (EXP.). The remaining steps, such as extraction (EXTR.), oil cleaning (ÖR), debenzining (EB), etc., correspond to the respective steps in the procedure in FIG. 1.

In accordance with the invention, it is also possible to put the (thermal) conditioning before the squeezing of the invention. This is indicated when the main component of oil is already gained in the squeezing process—that is, when raw material with a high oil content, such as olives, the fruit of oil palms, cacao seeds, cocoa, and the like, is used. However, the procedure of FIG. 3 can also be used in a combination of squeezing and extracting on raw materials with a high oil content and husk material.

Figure 4:
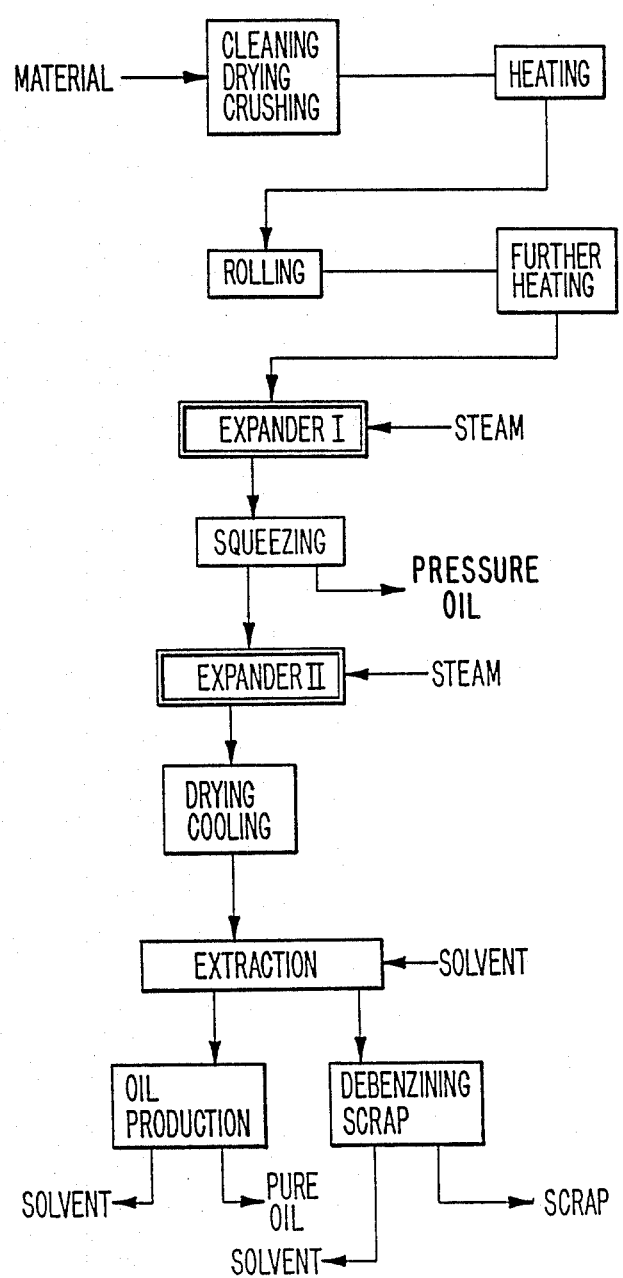

Especially for rapeseed, cottonseed and linseed with up to 45 percent oil by weight (in meat and husk), a procedure such as that shown in FIG. 4 has satisfied expectations. In that procedure, the plain-rolled material is fisst conditioned (thermally) (EXP. I) in accordance with the invention under relatively mild conditions, then the warm or hot material is squeezed (PR.), with pressure oil (PÖ) being obtained, the press cake from (PR.) is (thermally) conditioned (EXP.II) again under intensified conditions, it is cooled (k) and finally it ss extracted (EXTR.) in a known manner. By this means, one succeeds in performing optimal extraction of the oil content in the husk and achieving a clear separation of the pressure oil (PÖ) from the meat and the extraction oil (RÖ) from the husk.

In all the possibilities mentioned above, the solvent is also returned (LM'') to the extraction unit from the debenzining.

Figure 5:
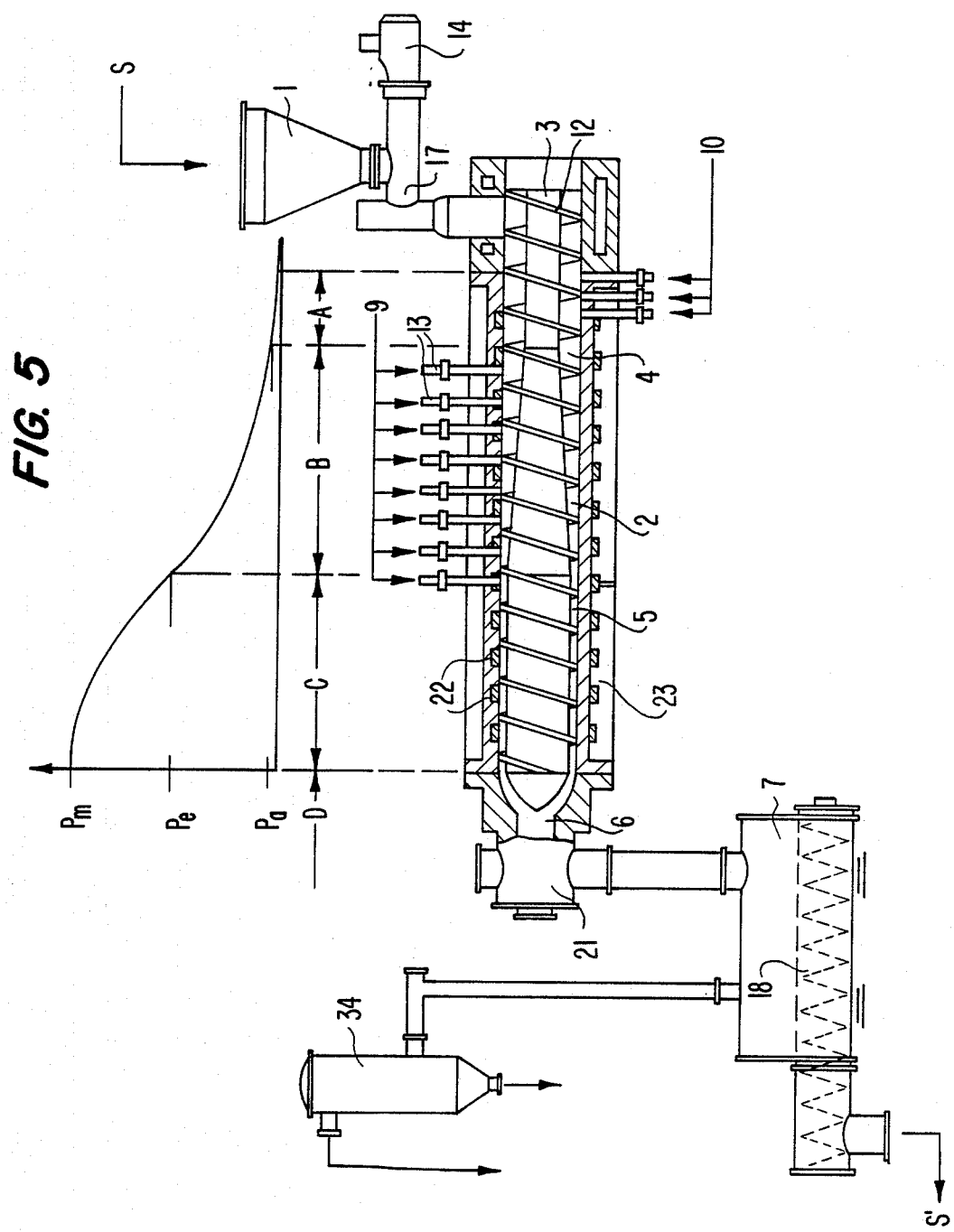
FIG. 5 shows an especially advantageous onditioning device for carrying out the procedure shown in FIGS. 1 through 4.

The device, or installation, shown in FIG. 5, which is especially suitable for carrying out the procedure of the invention for thermal conditioning, works in reliance upon the principle of the one or more screw conveyor presses that are known from the food, plastics and medicines technology.

The material (S), which has been cleaned, dried, crushed, heated and plain-rolled, if appropriate, in accordance with FIGS. 1 through 4—little soy bean slabs from 0.4 to 0.6 mm thick, for example—which has been brought in through the charging funnel (1) by means of a suitable dosing and control apparatus (14), comes in a continuous flow through the connecting piece (17) into the collecting zone (A) of the system for building up pressure that is made up of a tank and a worm shaft (3) and passes through it through the compression zone (B) and the high-pressure zone (C) to the decompression and expansion unit in (D) after an optimal pressure ($P_m$) has been reached.

In the area of the collecting zone (A), there are one or more intake jets for steam of 1 to 3 bar (10), for example, through which the entire collecting area, including the connecting piece (17) and beyond, is charged with a water vapor atmosphere. By this means, the collectig zone is already essentially free of air and oxygen and oxidating influencing of the material to be conditioned is out of the question. Part of the steam fed in through (10) leaves zone (A) through the funnel (1) and part of it penetrates inside the device into the zone (B).

The little soy bean slabs introduced through (1)—in terms of which the new procedure will be explained in the following through examples—have a moisture content of approximately 10 to 12 percent by weight initially. They are picked up by the shearing elements (12) in the collecting zone (A) and begin to build up a pressure in the material toward the end of that zone. When transition to the compression zone (B) takes place, that pressure has a value ($P_a$) or approximately $0.1 \times (P_m)$ and increases practically linearly until the high-pressure zone is reached.

As can be seen in FIG. 5, the passage depth of the shearing elements (12) has a minimum value (5) in the area of the high-pressure zone (C) by comparison with the width of the screw conveyor, and it expands (2, 4) in the direction of the conveying of material in to zone (A).

In practice, with little soy bean slabs 0.52 mm thick in an operating installation, a pressure ($P_e$) of 8.5 bar was ascertained, just in terms of the decreasing passage depth in the zone (B), to be present, and that pressure increased up to the maximum value ($P_m$)—that is, shortly before leaving the high-pressure zone (C) and entering the expansion zone (D)—of 10.5 bar.

Since the compression zone (B) is of decisive importance for the building up of pressure, the introduction of high-pressure water vapor (9) through a multiple-jet system (13) takes place in that zone. In the present case, the pressure of the water vapor through (9, 13) was near 6 bar, and in general it is between 4 and 10 bar.

Part of the continually compressed material is heated by supplementary heating elements (22), and part is heated by the steam (9), to the prescribed temperature—to 136° C. in special cases—as it passes continuously through the conditioning system. At the same time, the water content rises to more than 12%, and to 18 to 20% in special cases. Toward the end of the high-pressure zone (C), a compact, heated material that is under pressure has formed in the passage (5) that emerges into the receiver (7) through the shearing slit (6) and connecting piece (21) while expanding to a pressure in the atmospheric range. As a result of the transiion from the high-pressure zone (C) into the connecting piece (21) and the stabilization zone (receiver) (7), a spontaneous, sudden release of pressure linked with a cooling off of the material to below 100° C. takes place. When that is happening, the receiver is preferably kept closed and the material is continuously discharged (S) by means of a suitable transportation system—for example, a screw conveyor (18) that can also be like an expander. It is desirable to connect the receiver (7) with a sucking jet pump or another system (34) capable of producing a vacuum (with a condenser located ahead of it) to locate a water vapor route to the shearing slit (6) in the area of the entire installation, on the one hand, and to draw off the water vapor entering the receiver with the expanded material (S'), on the other.

Naturally, the conditioning installation of the invention described above can undergo numerous alterations and improvements. Additional cooling elements (23) can serve the purpose of regulating tee temperature. Simple and multiple screw conveyor systems, straight or conical double screw conveyors, screw conveyors with various passage sizes, different shearing elements, retracted knubs for rotating the material, retracted knubs with more than one metering zone (zone of compression B), etc., can be used in the above-indicated way.

Furthermore, the new conditioning procedure is not confined to the system shown in FIG. 5. Other systems building up a gradual pressure, such as continuous mixers, pumps, piston elements, etc., are also suitable, where it is possible to satisfy the requirements of a build-up of pressure, an inert atmosphere, a building up of the temperature and a spontaneous and sudden release of pressure and an expansion of the compressed material is made possible that is the equivalent of a sudden chilling from high pressure and high temperature to atmospheric conditions and below 100° C. to temperatures of 60° to 90° C. and some pressures that are below atmospheric pressures, if applicable.

In regard to the construction of the installation shown in FIG. 5, it should also be said that it can be operated completely continuously. Matrixes for shaping, and especially for hollow bodies (pipe lines, etc.) can be connected with the shearing slit (6), so that an expanded material produces a big surface. Not only is the subsequent cooling and drying process at the receiver (7) made easier by this means, but the solvent percolation in the extraction procedure is further promoted.

The installation represented schematically in FIG. 6 operates according to the same principle as the installation shown in FIG. 5—that is, a gradual build-up of pressure in the material, a transition to high pressure by means of high-pressure water vapor and a spontaneous and sudden release of pressure.

What is different is the fact that, in the installation shown in FIG. 6, the container forming the high-pressure zone (C) is a simple pressure tank (25) there.

The material (S) to be conditioned first comes hhrough the funnel (1) to a conveyor unit (24) that preferably is a screw conveyor, a pressure screw conveyor or a screw conveyor resembling an expander.

Here, too, as in the installation shown in FIG. 5, both the funnel (1) and the connecting piece that has a dosing and regulating system (not shown), if desired, and links the funnel to the unit (24) are charged with rinsing steam to create an atmosphere that is as free of air and oxygen as possible.

In principle, the unit (24) constitutes the collecting zone (A) shown in FIG. 5. It leads on into the compression zone (B) and from there directly into the actual high-pressure zone (C), which in the present case is a high-pressure receptacle (25).

The receptacle (equipped with a manometer (26) and a pressure-relief valve (27)) is charged with high-pressure water vapor (9) through the multiple-jet system (13). The pressure receptacle (25) naturally can also be equipped with heating and cooling elements (not shown).

As a result of the inflow of the high-pressure water vapor (9), the high-pressure zone (C) builds up in (25). The prevailing pressure and temperature conditions correspond to a great extent to the conditions for FIG. 5 that have been discussed.

The release of pressure and expansion of the material takes place in accordance with FIG. 6—through a suitable system of valves (28), if desired—into the receiver (7), and it is advantageous for the transition from the pressure receptacle (25) to the receiver (7) to take place through a second conveyor unit (29) that can be constructed like the unit (24). It has proved advantageous to charge the conveyor unit (29) with rinsing steam, too, to maintain an atmosphere that is free of air until the material cools down.

The receiver (7) serves as a stabilization zone in which the material cools off to temperatures below 100° C., with additional assistance from the vacuum-generating system (34). That system also takes care of getting the release-of-pressure steam from (25) and the rinsing steam drawn off through (30) constantly, and by that means the ingress of air or oxygen is completely forestalled. Preferably, again, a sucking jet pump serves as the vacuum-generating system, although any other technology can be used (a vacuum pump, a blower, etc.).

A suitable discharge element for the receiver (7), which can consist of rotating sluices (18), screw conveyors, properly-designed slides, valves, etc., forms the element located at the end of the installation. The material (S-) leaves the installation in an expanded, thermally conditioned, loose form.

Example: Soy bean material with moisture of 12.3 percent by weight and an oil content of 19.75% originally, was given preliminary treatment in a known way and rolled out to little 0.52 mm slabs on plain rollers at a temperature of 56° to 58° C.

In classic procedures known up to the present, the plates that were rolled were approximately 0.25 to 0.3 mm thick.

Under the conditions mentioned above, approximately 350 kg of the material could be conditioned per minute in a single-screw-conveyor expander of a length of approximately 3,000 mm (zones A+B+C). The maximum temperature during the transition from (C) to (D) was near 136° C.; the maximum pressure ($p_m$) was 10.5 bar. The expansion, with simultaneous cooling to 96° C., into the receiver (7) took place in a fraction of a second. After cooling and a short supplementary drying process, the water content of the easily-crumbled material was near 11.1%. The bulk weight was approximately 480 to 520 kg/m$^3$.

This material, after extraction with hexane, separation of solvent and separation of scrap, yielded a de-slimed and physically bleached oil with a total phosphorus content of 0.2 ppm. The urease activity in the toasted scrap was measured at 0.022 (mg N/g/min/30° C.). The protein solubility was about 75%.

Calculation of the water-soluble protein figure was accomplished by obtaining the PDI (protein dispersibility index) figure. The PDI figure is derived from the quantity of nitrogen that goes into solution under standard conditions when stirred rapidly or centrifuged. It is generally a few units higher than the figures obtained by determining the NSI (nitrogen solubility index) figures.

No matter what method of analysis is used, contents of water-soluble protein are found in the scrap produced in accordance with the invention that are twice as high as those of products obtained in accordance with conservative procedures—that is, without the thermal conditioning of the invention.

The total crude oil yield amounted to 99.1 percent by weight (residual oil in the scrap).

A material used for comparison that received corresponding preliminary treatment with little slabs 0.25 mm thick provided a scrap, without the (thermal) conditioning of the invention, with a soluble protein component of 38%. In spite of being dried and toasted under conditions identical with those prevailing when the soy bean material was conditioned as described above, the scrap had a pungent, irritating odor resembling that of ammonia. The measured urease activity per gram/min/30° C. was near 0.12 mg of nitrogen.

In the present case, the oil obtained at the same time still had a total phosphorus content of 1.95 ppm.

However, the considerable improvement in the amount of time consumed is important. The conditioning process of the invention only requires the material to remain in the conditioner for a few fractions of seconds, and consequently results in a considerable saving of energy while production increases at the same time.

As shown in FIG. 7, the supplementary device consists of the actual contact pressure head (40), whsse geometry is flat opposite the outlet of the expander and the matrix flange (140, 300). The contact pressure head (40) is pressed against the central aperture (130) of the matrix flange (300) by means of a spring element (110) that is seated in guide disks (80) and around the piston (70), thus closing the expander outlet (140) tightly while the pressure P is building up in the expander—the material is conveyed out of the expander as indicated by the arrow f.

In the simplest version, the matrix flange (300) is fastened to the end flange (200) of the expander by bolts and nuts (90). Furthermore, it is kept at a distance from the end flange (60) of the contact pressure head (40) by support elements (120). The expander itself is not shown in FIG. 7 for reasons of simplification since it has already been explained in FIG. 1 in conformity with the original patent, in the first place, and since it does not exert any direct influence on the construction of the present patent, in the second place. However, the outlet end—area (140)—of the expander is defined by the end flange (200) and the direction (f) the material is conveyed.

Cutters (50) can be installed on the matrix flange (300) and fastened to it by welding or bolting them. These serve the purpose of pulverizing the material being processed after its spontaneous discharge from the expander through the discharge slit when the contact pressure head (40) is pulled back, with that spontaneous discharge being caused by the dropping of the pressure from P to P'. In order that the pulling back of the head (40) from the expander's aperture can take place unhindered, notches (50') are put into the contact pressure head—cf. also FIG. 7a—and they are designed in such a way that they do not affect the absolutely tight closing of the expander-matrix aperture in the build-up phase of the pressure P.

The contact pressure head (40) with the spring elements (110) can be separated from the expander flange (200) quickly and at any time by removing the bolts (90), and it can be replaced if necessary. The spring (110) can also be put under tension or relieved of tension in the simplest manner by means of the bolt at the end (100), so that, depending upon how the procedure functions—for example, if a change in the time the material remains in the expander becomes necessary, a corrected regulation of the fluid content in the material is applied, or because of other parameters connected with the material—the pressure P'', which is the counterpressure, can be varied while the procedure is going on.

During the phase P when the pressure is building up in the expander—that is, when the contact pressure head (40) is tightly against the discharge aperture of the expander—the material is pushed through the conveyor unit of the expander (cf. FIG. 5) against the matrix flange (300) in the direction indicated by the arrow (f), so that an accumulation of material takes place that produces the previously calculated and determined pressure P that is dependent upon the product. Accordingly, the spring element (110) is set at the counterpressure P'' that is equivalent to the pressure P.

Now, if the maximum pressure, or the expander pressure, P is exceeded—that is, if $P>P''$—the contact pressure head (40) falls back (to the right, according to FIG. 7) in the direction indicated by the arrow (150), so that the spring (110) is compressed. Through the gap between the contact pressure head (40) and the matrix flange (300), which now is open, the suddenly expelled material (release of pressure from P to P') goes into the collecting or expansion receiver (7) located under the contact pressure head, possibly over the cutters (50) with the pulverizing action (cf. FIG. 5).

As soon as the drop in pressure P→P' is finished, the spring element (110) pushes the contact pressure head (40) back (to the left, in the direction indicated by the arrow (150')) until it is up against the matrix aperture (130) or the matrix (300) and, in so doing, closes the expander or only keeps it open enough to handle what material accumulates ($P \approx P''$) or until the transition from $P<P''$ to $P>P''$ is finished.

The pressure P in the expander can be controlled by designing the spring element (110) appropriately. On the other hand, the maximum pressure P in the expander, which is defined by the presumed parameters of the procedure (time devoted to processing, temperature, pressure or high pressure, fluid content in the material, ability to flow, material quality being striven for, volume capacity of the expander, performance of the moving expander parts, etc.), determines the counterpressure P'' that is necessary for carrying out the procedure.

Figure 8A:
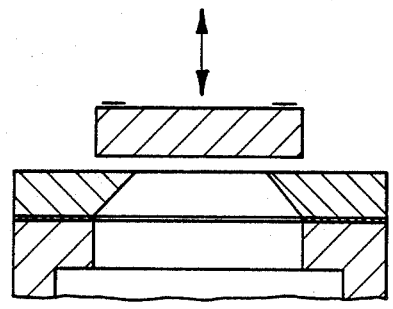
Figure 8B:
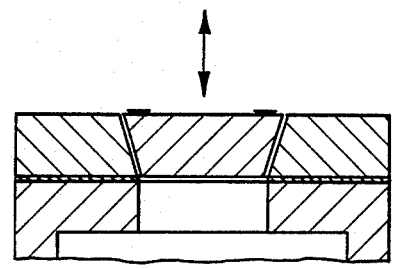
Figure 8C:
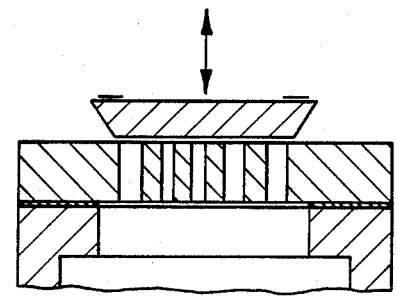

As FIG. 8 shows, the contact pressure head (40) can, in the simplest case, be a disk that is circular or has a similar appearance (FIG. 8a). It can also be a truncated cone (FIG. 8b) against a single-aperture matrix or directly against the expander outlet, or it can be a truncated cone, etc., against a multi-aperture matrix (FIG. 8c). The geometry of the contact pressure head, the matrix if it is used and the end flange will depend upon the peculiarities of the specific course taken by the procedure on any occasion, and especially upon the rheological characteristics of the material being processed in the expander.

The maximum pressure P in the expander—that is, the operating pressure in the expander—at which the subsequent spontaneous release of pressure to the pressure P' takes place, can also determine the throughput of material per unit of time, the nature of the counterpressure element and the way it works, for example, whether it is a spring, a hydraulic mechanism, a pneumatic mechanism, or something similar, and the construction of the contact pressure head, the matrix, the end flange of the expander and the outlet aperture of the expander.

In FIG. 9, another, especially suitable variant of the device of the invention is represented. It differs from the one shown in FIG. 7 in regard to the nature of the counterpressure element. There the pressure P'' (counterpressure) is reguaated hydraulically. When the expander's outlet aperture is closed, the contact pressure head (240) is up against its end flange (280) and the matrix flange (230). In this preferred embodiment of the invention, the counterpressure P'' is hydraulically regulated.

To accomplish this, the pump (p) draws the hydraulic oil in through the filter (f) and conveys it into the pressure line (a). A conduit branches off from that to the relief valve jet (v1) while the main flow of oil passes the pressure-regulating valve (d). The desired pump pressure, and consequently the counterpressure P'' of the installation, is regulated at the pressure valve (v 1). A part of the oil conveyed by the pump flows through the pressure-regulating valve (d), while the excess oil flows back into the oil receptacle (not shown) through the valve (v1).

The conduit (a) leads to the jack in the hydraulic mechanism that is designated (220) and moves the thrust piston there, which, in turn, starts the rod (210) moving that pushes the contact pressure head (240) against the matrix (230) or the end flange (280) of the expander. Since the thrust pressure on the thrust piston of the hydraulic mechanism is always lower than the pressure of the pump (p), the counterpressure P'' must be designed to be higher than the pump's pressure. The oil in the thrust piston of the hydraulic mechanism (220) that is expelled goes into the oil receptacle through the conduit (b) and the counterpressure valve (v2).

Of course, only one possible way of moving the contact pressure head hydraulically is being sketched here. Naturally, the basic method of operating described above can also take place with a throttling in the oil outflow, with a multiple-pump system, with a hydroreservoir or with hydromechanical propulsion. A direct coupling of the working pressure P in the expander wihh the pump pressure in (p)—adjustable by means of the pressure valve (v1)—is provided, so that, by means of a suitable regulating mechanism, the hydraulic pressure is controlled by the working pressure or adjusts itself as a function of the working pressure. Providing details regarding such an arrangement would be superfluous since it is known to experts. To complete the picture, it should also be pointed out that, in FIG. 9, the mounting support of the contact pressure head (240) with the hydraulic mechanism (220) on the end flange (280) of the expander—bolted coupling—is designated (229) and the reference number (250) stands for the cutters on the matrix dik (230) and the number (250') stands for the indentations in the contact pressure head (240).

EXAMPLE 1

In an expander with worm gear conveyance—direction of discharge indicated by the arrow (f) in FIG. 7—with a diameter of approximately 200 mm and a total length of approximately 30,000 mm, approximately 20,000 kg of soy bean flakes (flake thickness approximately 0.35 mm) are heated in a direct water vapor atmosphere to a temperature of approximately 125° C. and brought to a working pressure P of 18 bar by the pressure of the material itself and by water vapor pressure. When it left the expander through a single-aperture matrix, the material had a moisture content of approximately 14 percent by weight and a weight per liter of approximately 520 g. The material was soft, damp and sticky in consistency. The release of pressure took place at approximately atmospheric pressure, in fact, but it was not spontaneous in the sense of the task that had been set for the invention, but instead the damp material "flowed" into the release-of-pressure zone (receiver 7) in a continuous stream that was only occasionally interrupted by harder ingredients.

In a quite general way, the material demonstrated an irregular distribution of water and moisture. Hard, dry areas and damp parts appeared alternately. The preliminary thermal treatment of the material that had been striven for did, in fact, take place, but a homogeneous material that could be conveyed directly to the extraction unit was only obtained to a limited extent.

Under similar working conditions in the expander, a contact pressure head (240) was brought up against the expander and the matrix flange (230—FIG. 9) that was controlled by a suitable hydraulic mechanism (220) and rod (210) and was adjusted to a pressure (P")—counter-pressure—of 18 bar (regulated at the pressure valve (v1)).

As a result of that, a gradually increasing working pressure of 18 bar built up in the expander until close to the contact pressure surface of the pressure head (24), and then it remained constant in front of the contact pressure surface, and after it reached a pressure of only a ltttle above 18 bar, it moved the contact pressure head against the hydraulic counterpressure and by that means exposed a ring slot between the matrix flange (230) and the contact pressure head (240) through which the material continually emerged in a dry, free-flowing, easily-crumbled (because it had been pulverzied by the cutters (250)) form. It went into the receiver that is designated (7) in FIGS. 5 and 6, moving in the direction of the arrow.

The situation described above at first remained completely constant—that is, material of uniformly optimum quality was drawn off over a rather long period of time without anything interfering with the course of production in any way. That means that the pressure P and the counterpressure P" had set up a condition of equilibrium with each other. As a result of a brief delay of the material in the expander, the expander pressure fell off to 14 to 16 bar. The expander's outlet closed immediately because of the thrust of the contact pressure head through the hydraulic mechanism, and it remained in that condition until the required pressure of 18 bar had appeared again in the expander and then was exceeded slightly and for a brief period. The original condition was restored in that way—that is, the course of the procedure was undisturbed.

As was said originally, an optimal woking together of the parameters of the procedure, and especially of the behavior of the material that is processed and to be processed as it flows—with that, in turn, being a function of the dampness of the material and the moisture, as well as of the temperature (when processing material in an atmosphere of steam)—the nature of the grain, plasticity, expander performance, etc., where the extreme high and low temperature and pressure values naturally also play a role, and do so to an especially great extent, since they determine the flexibility of the procedure, is of decisive importance where the way the contact pressure head and the entire device of the invention work is concerned.

The additional production process described above was observed for several days, with soy bean flakes being processed without incident and with the indicated quantities being put through the process under the indicated conditions of temperature and pressure. Measured by international technical standards, material that was subjected to a preliminary thermal treatment in conformity with the task of the invention is obtained that—in contrast with work that does not make use of the device of the invention—did not require any supplementary drying or other conditioning and could be conveyed directly into the process of extraction with solvents. Furthermore, the material could be kept in the open air as long as was desired without changing its rheological and/or chemical characteristics, which, experience has shown, is never the case with products obtained by other preliminary treatment procedures or without the contact pressure head of the invention.

In particular, however, it turned out, surprisingly, that the procedure of the thermal conditioning of natural products intended for extraction under high pressure with water vapor at temperatures above 130° C. that is traced here results in a considerable, advantageous alteration in the characteristics of the material.

Thus, the oil obtained by extraction with hexane at approximately 66° C. still had only approximately 0.02 percent by weight of phosphatides after the desliming, while that figure, starting with similar original material—that is, material that also had been given preliminary thermal treatment but without using the device of the invention on the expander —was calculated at between 0.3 and 0.6 percent by weight. Furthermore, an extraction residue was obtained whose urease activity was measured at 0.02 (mg N/g/min/30° C.) by comparison with 0.12 mg N/g in the case of conventionally obtained scraps (determined after drying and toasting the residue).

The use of the contact pressure head (240) in accordance with this supplementary application takes place in the device for conditioning oil seeds and oil fruit thermally according to (Original) U.S. Pat. No. 3,529,229 at the material-discharging end of the expander—that is, in the area of the transition from the shearing slit (6) (FIG. 5 of the original patent) and the connecting piece (21) to the receiver (7) and, at the discharge end of the high-pressure cylinder (25) (FIG. 6) in the area of the system of valves (28), which, if desired, leads on to the receiver (7) by way of the conveyor unit (29).

The way the contact pressure head is installed in the outlet conduit of the expander, on the matrix flange or at the outlet for the material from the high-pressure receptacle (25) is of no importance where the carrying out of the procedure or the operating of the installation are concerned as long as the task of the building up of pressure followed by spontaneous release of pressure is carried out. Since the installation of the contact pressure head is a problem that is exclusively concerned with construction technique that is familiar to any builder of apparatuses, an explanation going into detail can be dispensed with.

The device represented in FIG. 10 is similar to the device shown in FIG. 5. It works in accordance with the principle of an expander—that is, the material is compressed, treated with high-pressure water vapor and expanded. In that process, the raw material (S), especially in the form of small rolled slabs 0.4 to 0.6 mm thick,—prepared, plain-rolled soy material, for example—passes through a suitable dosing apparatus (14) and the filling funnel (1), the filling and homogenizing zone (A), the transition zone or zone for building up pressure (B), the maximum pressure zone (C) and the expanding and expulsion zone (D), one after the other. Throughput is continuous, and it is controlled by the dosing apparatus (14).

Underneath the lead-in tube (17) are one or more supply jets for water vapor (10) through which the filling zone (A) is constantly charged with an atmosphere of steam. Part of the steam leaves the zone (A) through the funnel (1) and part of it goes on with the material to the other stages of the installation. By this means, the air in that area of the device is expelled and a practically oxygen-free system is created. This is, as has already been said, of great significance for the new procedure since any kind of oxidation reaction is excluded in the following high-temperature treatment.

The material (S) that is continually fed in through the filling funnel (1) and the dosing device (14) has an initial moisture content of approximately 8 to 12 percent by weight.

In the high-pressure cylinder (11), there is a worm shaft (3) with cutting elements (12) that is borrowed from extruder construction, and in certain sections of zones the cutting elements can also run as spirals, thus performing a function of mere shoving. In addition, knubs (19) arranged in a row or staggered opposite each other and accessible from outside can be provided that make constant rotating of the material during its transportation through the cylinder (11) possible.

Beginning already in the filling zone (A), a pressure in the material itself is built up on to the end of the zone (B)— and beyond it—until the moment of expansion at the crossing from zone (C) to zone (D), reaching its maximum value ($p_m$) of 25 bar, for example, at the end of the zone (C) (also cf. diagram in the illustration). That maximum value naturally depends upon the nature and the outlet cross section of the matrix (20)—for example, the number of borings in a perforated disk and the quantity of material put through in a unit of time.

At the beginning of the zone, the pressure in the material (which, as has been said, is a function of the conveyance and quantity characteristic) is approximately 3.0 to 3.5 bar and at the end of the zone (B) it reaches a value ($P_e$) of approximately 8 bar.

Since the zone (B) is of critical importance for the building up of pressure, the introduction of the high-pressure water vapor (9) through several dispersed jets (13) takes place in it. Of course, this feeding in of steam is regulated and controlled. Measuring and regulating elements are not shown in the illustration because their nature goes without saying.

After the material (S) has been treated, at the pressure of the material indicated above of approximately 8 bar (transition from zone (B) to zone (C)), with the quantity of steam (water vapor with a pressure of approximately 4 to 10 bar) required for a water content of approximately 12 to 20 percent by weight and a temperature (determined in the material) of preferably 125° to 140° C., it goes through the matrix (20) by way of the shearing slit (6) and into the expansion and expulsion zone (D), where, as a result of a release of pressure, a partial vaporization of the moisture absorbed by the material in the outlet pipe (21) and (if applicable) farther on into the stabilization zone (7) takes place, so that the required final water content for extraction appears. Under certain circumstances, a slight supplementary drying process to obtain a more exact adjustment of the moisture content in the material—as is required for the extraction process—may be useful.

As the schematically represented course taken by the pressure ($p_o$ to $p_m$) shows, the pressure ($p_m$) first builds up to approximately 10 to 20% of the maximum pressure ($p_m$) of 25 bar, for example, in the zone (A), where the passage size (4) is uniform, and, as a result of the narrowing down of the passage size (2) in zone (B) and the persistent—that is, constant—passage size (5) in the zone (C), it then gradually reaches its optimum value. The feeding in of high-pressure water vapor takes place in the area of zone (B)—that is, between the pressure values ($p_a$) and ($p_e$), which include a range of approximately 20 to 30% of the total pressure ($p_m$).

By this means, the material is given sufficient time, before reaching the final pressure, to absorb the required amount of moisture and reduce the influence of temperature and steam in the zone (C) again in that way. The high-pressure steam treatment should be finished at about the time of the transition from zone (B) to zone (C).

It is advantageous, but not necessary in every case since it depends upon the material, for the expansion of the material that has been compressed in the zones (B) and (C) to take place at atmospheric pressure just beyond the matrix (20)—through the outlet pipe (21)—into a space (7) that is free of air and oxygen that—closed all around—is equipped with a continually-operating discharge device (18), for example. It is also advantageous to maintain a water-vapor-saturated atmosphere or an atmosphere consisting predominantly of water vapor in the space (7) until a stabilization and cooling of the expanded material below approximately 100° C. is achieved. Experience has shown that the time spent in the stabilization unit (7) is approximately 1 to 15 minutes in a pressureless atmosphere of steam. After the prescribed period of time has expired, the expanded material (E) can be discharged, further dried and cooled, if necessary, and conveyed to the extraction unit.

The device represented in the illustration is especially suitable for carrying out the new procedure for the preliminary thermal treatment of leguminous seeds for obtaining oil by extraction with solvents.

In that connection, it is clear that other installations or installations that deviate from the system that is shown in their general technical design can also accomplish the same purpose if the conditions of an atmosphere free of air and oxygen, continuous compression of the material, high-pressure steam treatment at the stated pressures and temperatures and sufficient processing time can be duplicated.

The expansion device that is shown is also not limited to the elements shown in the drawing. Thus, single-stage or multistage screw conveyors or spirals—cascade systems, for example—can be used. Single screw conveyors, double screw conveyors or multiple screw conveyor systems are also suitable.

The calibrsting and shaping tools (matrixes) (20) connected with the shearing slit (6) may be suitable for constructing strands of material, pipe pieces or other geometrical shapes. Perforated disks with a large number of bored holes, spike points and punches, etc., also serve the purpose of carrying out the central expansion of the expanded material. Retaining liners have the additional effect of increasing the geometrical resistance. The making of tube-shaped strands of material has a special advantage with respect to the subsequent drying and cooling of the material. By continually cutting the tube-shaped substances open with rotating cutters, for instance, a material with an especially large surface is obtained that not only makes the cooling and drying process easier, but also the extraction (percolation). The expenditure for apparatus for those stages is considerably reduced in that way.

The device naturally can be equipped with suitable adjustable tempering systems (22) for heating or cooling—by means of a circulating oil circuit or an electric heating device, for example. An agglomeration of the material (S) before it enters the preliminary thermal treatment process, which has been customary up to now, is generally not necessary since the approximately 0.4 to 0.6 mm thick flakes (small rolled slabs)—of soy beans, for example—make that process superfluous.

EXAMPLE II

In a single-screw-conveyor expander constructed as shown in the drawing, with a screw conveyor diameter (cylinder diameter) of $D=320$ mm and a total screw conveyor length of approximately 30D (zones $A+B+C$), 20,000 kg an hour of soy bean flakes (little rolled slabs) with an average thickness of 0.45 mm and an average moisture content of 10.95 percent by weight were subjected to preliminary thermal treatment and then prepared for the extraction process.

The initial temperature of the material (S) was approximately 55° to 58° C. in the funnel (1). That temperature resulted from the flaking process on plain rollers.

Before bringing the first flake material in—that is, when the installation was put into operation, water vapor at atmospheric pressure was sprayed in through the conduit (10) until a practically airfree water vapor atmosphere was produced in the area of the filling funnel (1), dosing apparatus (14) and zone (A) systems. The steam was constantly conveyed to the open air through the funnel (1), but part of it also—accompanied by partial condensation—passed through the entire expander to the stabilization zone (7).

As soon as a concentrated steam atmosphere was produced, bringing the flake material (S) in was begun and the installation was adjusted by regulating the dosing apparatus and the speed of conveyance of the screw conveyor to a speed of the flow of material of 300 kg/min (throughput). When that was being done, the supplying of steam through conduit (10) was not interrupted, but it could be throttled down considerably.

After a pressure of $(p_a)=3.4$ bar at the beginning of zone (B) and a pressure of $(p_e)$ of 8.0 bar at the end of zone (B) had been set by the pressure of the material itself (as a function of the speed of rotation of the screw conveyor shaft (3), of the cmmpression by the sizes of the passage (4, 2, 5), which grow smaller, and the shearing action of the screw conveyor pin and the screw conveyor knubs), enough high-pressure water vapor was forced in, distributed through the connecting piece (13) and the zone (B)—also partly in the beginning of the zone (C)—so that the material in the indicated pressure area had a temperature of 130° C. The amount of steam and the steam's pressure and temperature were adjusted to this value of the temperature of the material.

In the further course of the process of transporting the material through the processing installation, the pressure of the material rose to $(p_m)=18$ bar. That value was determined shortly before the shearing slit (6) was reached—that is, toward the end of zone (C) and before the matrix (20) was reached.

In the case of the present example, a disk (20) with a number of holes whose diameter was approximately 3.8 mm was inserted in front of the terminal head of the screw conveyor (3) to close off the shearing slit (6)—and consequently the zone (C). The hot material emerging through the perforated disk—which also, as a result of the flash vaporization, pushed a screen of steam ahead of itself—then came directly into a stabilization zone or heat-maintaining zone (7) filled with water vapor at atmospheric pressure and from there, after remaining for a period of approximately 2 minutes, continuously, by way of a discharge screw conveyor (18), into a cooling and drying unit (not shown) as the end product of the preliminary thermal treatment.

The zone (7) was designed so that it could receive at least 20 percent by volume of the material brought into the expander per unit of time.

In front of the matrix (20), the material had a maximum temperature of 145° C., and the temperature did not fall below 130° C. on the average. When it came into the stabilization zone (7), the material cooled down further. After approximately 2 minutes in that zone and subsequent cooling and drying, a temperature of approximately 55° C. made its appearance. The water content was approximately 10.5 percent by weight; the waste weight was approximately 520 kg/m$^3$.

This material was extracted with hexane at approximately 66° C. in the counterflow in an experimental extractor, with known conditions concerning concentration (miscella) being maintained. The entire yield of crude oil was calculated at 99.2% (residual oil in the scrap). The entire phosphatide content of the crude oil before further processing (desliming, etc.) was approximately 4.48 percent by weight. In an ensuing desliming process (hydratizing and flocculation), the phosphatides that were first dissolved colloidally were separated. When that was performed, it turned out, surprisingly, that an oil is already obtained by the stage (which is known) of hydratizing (with water and water vapor or a slightly acid aqueous medium at a higher temperature) with precipitation and separation of the precipitate, and that oil then only has approximately 0.025 percent by weight of phosphatides.

In the classic heat treatment in heat pans and ensuing extraction, on the other hand, approximately 2.0 to 2.5 percent by weight of phosphatides are found in the crude oil and the phosphatide content after the desliming falls between 0.3 and 0.8 percent by weight, on the average. Such oils cannot be refined under commercial conditions. Therefore they require an alkali treatment to make them usable.

The new procedure results in an increased yield of lecithin and, connected with that, a smaller lecithin content in the crude oil after the desliming. As a result, it is possible to give the oil a physically optimal refining after a treatment with fuller's earth, so that the familiar high cost of refining is considerably reduced and the waste water problems connected with refining are dealt with in the best possible way.

As the results indicate, the decomposition of phosphatides in the oil can be increased by nearly 40% by comparison with known procedures just by the hydratizing process.

The acid precipitation of the residual phosphatides according to the invention results in an oil that then only contains approximately 16 ppm of those foreign substances. After the treatment with fuller's earth, a completely clear oil for food that was free of phosphatides (calculated over all of the phosphorus) and had a pale yellow color was obtained.

The phosphatide mixture that was separated from the oil was further processed with a treatment with water and evaporation of water, and it yielded a pure lecithin of the best quality with respect to color, odor and taste. It could be delivered immediately for direct further utilization in the food and pharmaceuticals sector.

In addition to the improvements to product quality and yield summarized above, the big savings of energy in operating the plain rollers for obtaining flakes—usual small slab thicknesses up to now, approximately 0.2 to 0.3 mm and approximately 0.4 to 0.6 mm in accordance with the invention—the saving of steam and energy by comparison with the customary, large-volume heat pans and heat towers, the shortening of the time taken up by the thermal treatment as a whole, the product-protecting treatment in the (pressure) expansion system at a high temperature and in an oxygen-free water-vapor atmosphere and the improvements in the percolation and extraction with respect to the throughput per unit of time should be mentioned especially as further advantages of the new procedure.

I claim:

1. A process for the treatment of vegetable raw material which is subjected to one of: (1) an extraction step, (2) a compressing step, and (3) an extraction step and a compressing step, and which vegetable raw material is also subjected to a thermal conditioning step in which the material is heated to a temperature above 100 degrees Celsius at a pressure above atmospheric pressure in an oxygen-free atmosphere, comprising:

carrying out the thermal conditioning step at a pressure of 2.0 to 25 bar for a time period of between 0.1 and 5 seconds, and after said time period, suddenly releasing the pressure, moving the heated material into an oxygen-free zone, and cooling the heated material to temperature below 100 degrees Celsius in said oxygen-free zone.

2. The process of claim 1, wherein the oxygen-free zone contains water vapor.

3. The process according to claim 2, wherein the water vapor is drawn off from the oxygen-free zone.

4. The process of claim 1, wherein the material is heated to a temperature between 105 and 148 degrees Celsius during the thermal conditioning step.

5. The process according to claim 1, wherein the thermal conditioning step is carried out at between 4.0 and 18.0 bar.

6. The process according to claim 1, wherein the thermal conditioning step is carried out at between 5.0 and 10.0 bar.

7. The process according to claim 1, wherein the pressure is generated by high-pressure water vapor.

8. The process according to claim 1, wherein the entire process is carried out in an atmosphere of water vapor.

9. The process according to claim 1, wherein the pressure is suddenly released from a receiver charged with water vapor.

10. The process according to claim 1, further comprising drying the material.

11. The process according to claim 1, wherein the material is subjected to a compressing step and an extraction step, and the thermal conditioning step takes place after the compressing step and before the extraction step.

12. The process according to claim 1, wherein the material is subjected to a compressing step and an extraction step, and the thermal conditioning step takes place before the compressing step and before the extraction step.

13. The process according to claim 1, wherein the thermal conditioning step is repeated.

14. The process according to claim 13, wherein the thermal conditioning step takes place before the compressing step and between the compressing step and the extraction step.

15. The process according to claim 1, wherein the material is leguminous seeds.

16. The process according to claim 1, wherein the material is soy beans.

17. The process according to claim 1 in which the vegetable raw material contains an oil, and the oil is extracted after the cooling of the material.

* * * * *

UNITED STATES PATENT AND TRADEMARK OFFICE
CERTIFICATE OF CORRECTION

PATENT NO. : 4,794,011

DATED : December 27, 1988

INVENTOR(S) : HEINZ O. SCHUMACHER

It is certified that error appears in the above-identified patent and that said Letters Patent is hereby corrected as shown below:

```
   Column 2, line 8, "add" should be --and---.
   Column 4, line 52, "condition" should be --conditioner--.
   Column 5, line 50, "(33)" should be --(23)--.
   Column 10, line 51, "0.0 bar" should be --10.0 bar--, and
             line 52, "60° C" should be --160°C--.
   Column 11, line 21, after "material", "pressure" should be
inserted.
   Column 14, lines 3 and 4, "transiion" should be ---transi-
tion--;
             line 22, "tee" should be --the--; and
             line 63, "hhrough" should be --through--.
   Column 18, line 57, "wihh" should be --with--.
   Column 19, line 1, "dik" should be --disk--.
```

Signed and Sealed this

Thirteenth Day of February, 1990

*Attest:*

JEFFREY M. SAMUELS

*Attesting Officer*     *Acting Commissioner of Patents and Trademarks*